United States Patent
Mansour

(10) Patent No.: US 10,353,698 B1
(45) Date of Patent: Jul. 16, 2019

(54) SYSTEM, METHOD, AND COMPUTER PROGRAM FOR COMPARING RPM PACKAGES

(71) Applicant: Amdocs Development Limited, Limassol (CY)

(72) Inventor: Edwar Adib Mansour, Upper Galilee (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 0 days.

(21) Appl. No.: 15/788,559

(22) Filed: Oct. 19, 2017

(51) Int. Cl.
*G06F 9/44* (2018.01)
*G06F 8/71* (2018.01)
*G06F 8/65* (2018.01)

(52) U.S. Cl.
CPC . *G06F 8/71* (2013.01); *G06F 8/65* (2013.01)

(58) Field of Classification Search
CPC .................................. G06F 8/65; G06F 8/71
USPC ................................ 717/120–122, 168–170
See application file for complete search history.

(56) References Cited

U.S. PATENT DOCUMENTS

| | | | |
|---|---|---|---|
| 8,255,363 B2 | 8/2012 | Johnson et al. | |
| 8,347,263 B1 | 1/2013 | Offer | |
| 8,640,119 B2* | 1/2014 | Vidal | G06F 8/71 |
| | | | 717/169 |
| 8,713,558 B2 | 4/2014 | Vidal et al. | |
| 8,863,114 B2* | 10/2014 | Shah | G06F 8/60 |
| | | | 717/175 |
| 9,207,933 B2* | 12/2015 | Bostick | G06F 8/71 |
| 9,397,910 B2 | 7/2016 | Miryanov et al. | |
| 9,448,780 B1* | 9/2016 | Hall | G06F 8/61 |
| 2011/0214114 A1* | 9/2011 | Vidal | G06F 8/71 |
| | | | 717/170 |
| 2012/0137138 A1* | 5/2012 | Gregorovic | G06F 17/30 |
| | | | 713/189 |
| 2012/0221890 A1* | 8/2012 | Das | G06F 8/71 |
| | | | 714/15 |
| 2016/0357541 A1 | 12/2016 | Offer | |

OTHER PUBLICATIONS

GitHub, "Pkgdiff—A tool for visualizing changes in Linux software packages", 2015, retrieved from https://web.archive.org/web/20151230221543 linked to https://lvc.github.io/pkgdiff, 7 pages. (Year: 2015).*

Paul Murrell, "Package 'compare'", Aug. 2015, retrieved from https://cran.r-project.org/web/packages/compare/compare.pdf, 22 pages (Year: 2015).*

* cited by examiner

*Primary Examiner* — Ted T. Vo
(74) *Attorney, Agent, or Firm* — Zilka-Kotab, P.C.

(57) ABSTRACT

A system, method, and computer program product are provided for comparing RPM versions. In operation, a system identifies a first version of a RPM data package to compare with a second version of a RPM data package. The system compares the first version of the RPM data package with the second version of the RPM data package. The system generates difference information based on comparing the first version of the RPM data package with the second version of the RPM data package.

20 Claims, 5 Drawing Sheets

US 10,353,698 B1

SYSTEM, METHOD, AND COMPUTER PROGRAM FOR COMPARING RPM PACKAGES

FIELD OF THE INVENTION

The present invention relates to RPM package comparison, and more particularly to a system for comparing different RPM packages.

BACKGROUND

Currently, systems have challenges identifying changes between different RPM package versions, such as an old version versus a new release version.

There is thus a need for addressing these and/or other issues associated with the prior art.

SUMMARY

A system, method, and computer program product are provided for comparing RPM versions. In operation, a system identifies a first version of a RPM data package to compare with a second version of a RPM data package. The system compares the first version of the RPM data package with the second version of the RPM data package. The system generates difference information based on comparing the first version of the RPM data package with the second version of the RPM data package.

DETAILED DESCRIPTION

Figure 1:
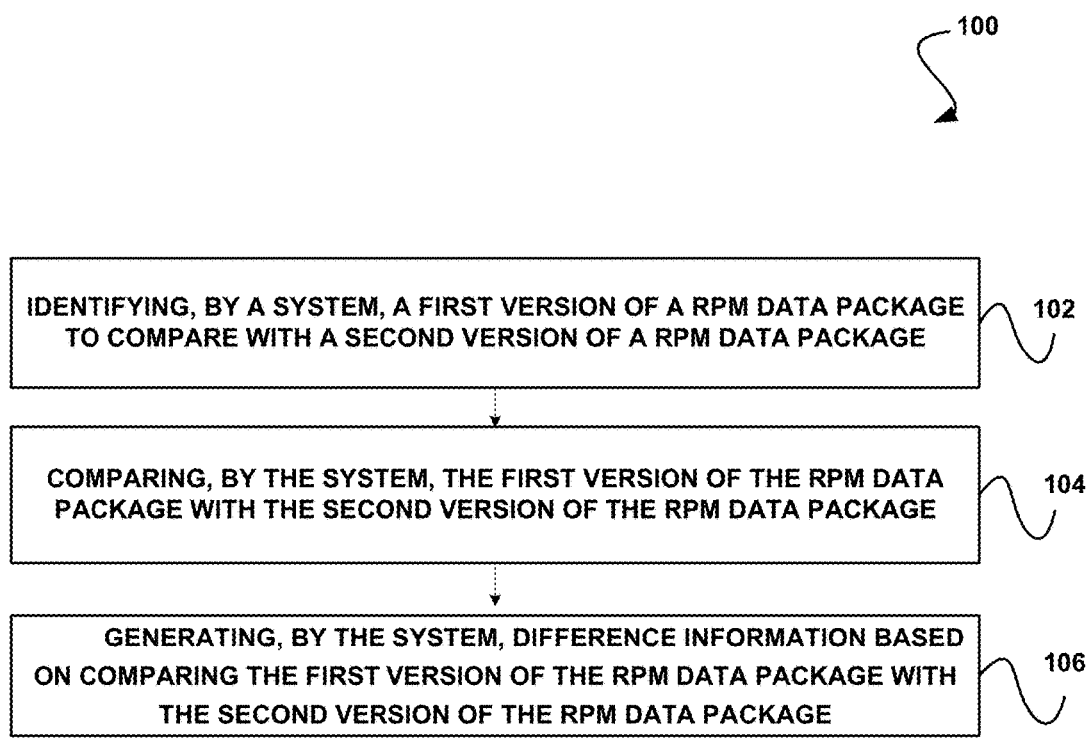
FIG. 1 illustrates a method for comparing RPM versions, in accordance with one embodiment.

FIG. 1 illustrates a method 100 for comparing RPM versions, in accordance with one embodiment.

In operation, a system identifies a first version of a RPM data package to compare with a second version of a RPM data package. See operation 102. The system compares the first version of the RPM data package with the second version of the RPM data package. See operation 104. The system generates difference information based on comparing the first version of the RPM data package with the second version of the RPM data package. See operation 106.

In one embodiment, the first version of the RPM data package may include a newer release than the second version of the RPM data package. The difference information may include any information indicating a difference between the RPM packages. For example, the difference information may include specification information (i.e. differences between specifications of the RPM packages). As another example, the difference information may include attribute information (i.e. differences between attributes in the RPM packages).

In one embodiment, the difference information may be delivered (e.g. released, etc.) as a code change between the first version of the RPM data package and the second version of the RPM data package. Further, in one embodiment, the system may generate a report showing the difference information. In this case, the system may display the report showing the difference information utilizing a user interface associated with the system. Of course, the system may email the report and/or otherwise publish the report.

It should be noted that the method 100 may be implemented utilizing various systems, hardware, software, applications, user interfaces, etc., as dictated by the implementer. For example, the system implementing the method 100 may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
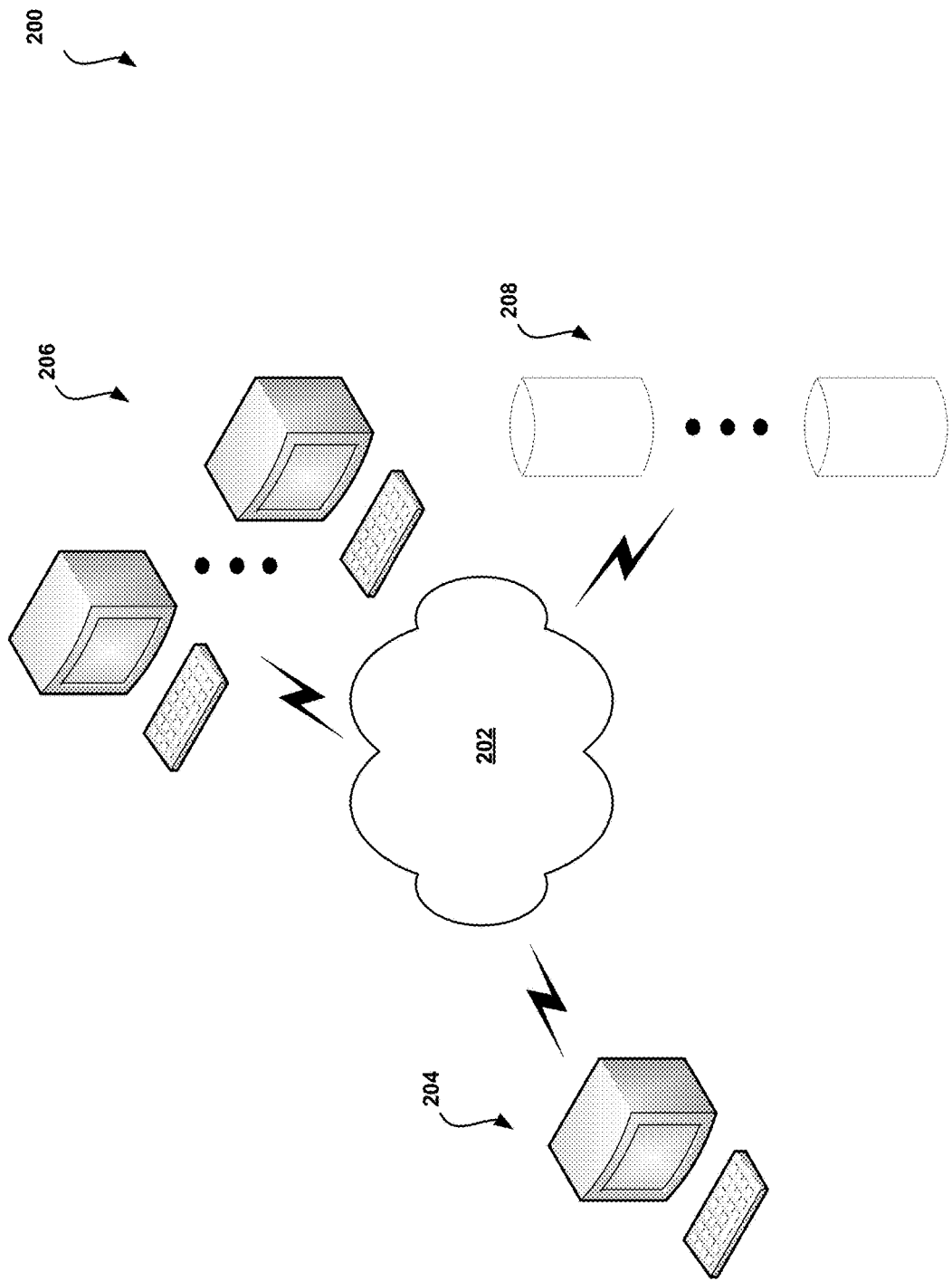
FIG. 2 shows a system for RPM version comparison, in accordance with one embodiment.

FIG. 2 shows a system 200 for RPM version comparison, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a system 204, which may implement a variety of applications or software, etc. The system 204 may be capable of communicating with a plurality of systems 206, either directly or over one or more networks 202, for comparing RPM package versions. The system 204 may also be in communication with one or more repositories/databases 208.

Currently, systems have challenges identifying changes between different RPM package versions, such as an old version versus a new release version.

The system 204 has access to the repositories 208 that may contain the changed RPM to make a delivery process more efficient. Utilizing the system 204, an operator can identify all the RPMs that were changed as part of a new release. In addition, by utilizing the system 204 it will be easier to track each RPM change and identify the change levels.

The system 204 provides the ability to deliver only changed RPMs (i.e. code changes) in comparison to previous releases. The system 204 easily identifies RPM specification changes between various versions. The system 204 is capable of discovering/identifying changes in java archives (jar, war and ear), in C++ files (so files), static files by checksum, as well as added and deleted files, etc.

The system 204 may also support the comparison of generated files, file owner and permission changes, dry mode execution (e.g. to obtain a report only, etc.), and support for a fast execution mode. The system 204 may also generate and display reports indicating comparison details (e.g. differences, etc.) between different RPM packages.

Figure 3:
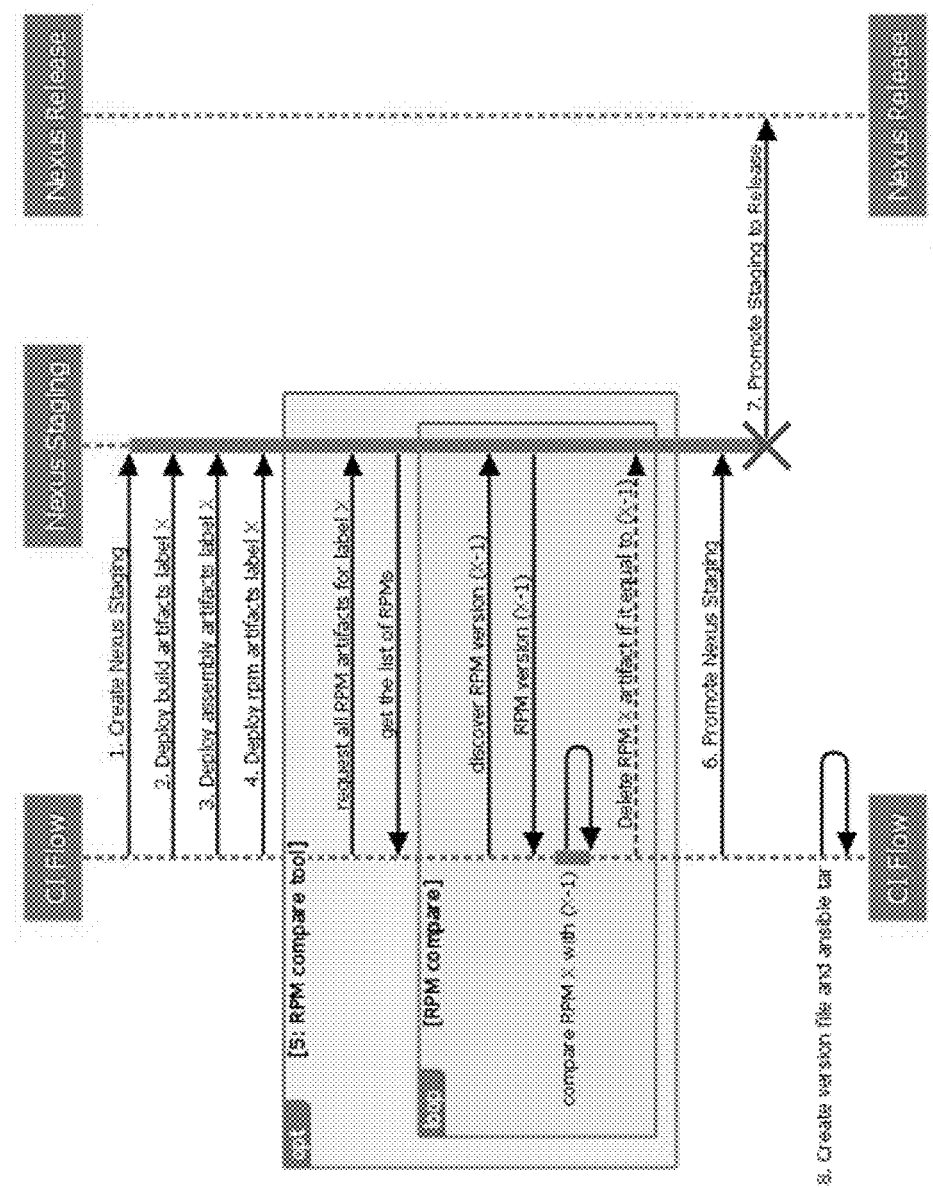
FIG. 3 shows a system flow diagram illustrating a RPM versioning comparison example, in accordance with one embodiment.

FIG. 3 shows a system flow diagram 300 illustrating a RPM versioning comparison example, in accordance with one embodiment. As an option, the diagram 300 may be implemented in the context of the details of the previous figures and/or any subsequent figure(s). Of course, however, the diagram 300 may be implemented in the context of any desired environment. Further, the aforementioned definitions may equally apply to the description below.

As shown, the system 204 creates Nexus repository staging. The system 204 deploys build artifacts label X. The system 204 also deploys assembly artifacts label X. Additionally, the system 204 deploys RPM artifacts label X. The system 204 then requests all RPM artifacts for label X. The system 204 obtains the list of RPMs.

The system 204 identifies/discovers and obtains RPM version (X−1). The system 204 compares RPM X with RPM (X−1). The system 204 may delete any RPM X artifacts if they are equal to RPM (X−1) artifacts. The system 204 also promotes Nexus staging and creates a version file and Ansible tar file.

Figure 4:
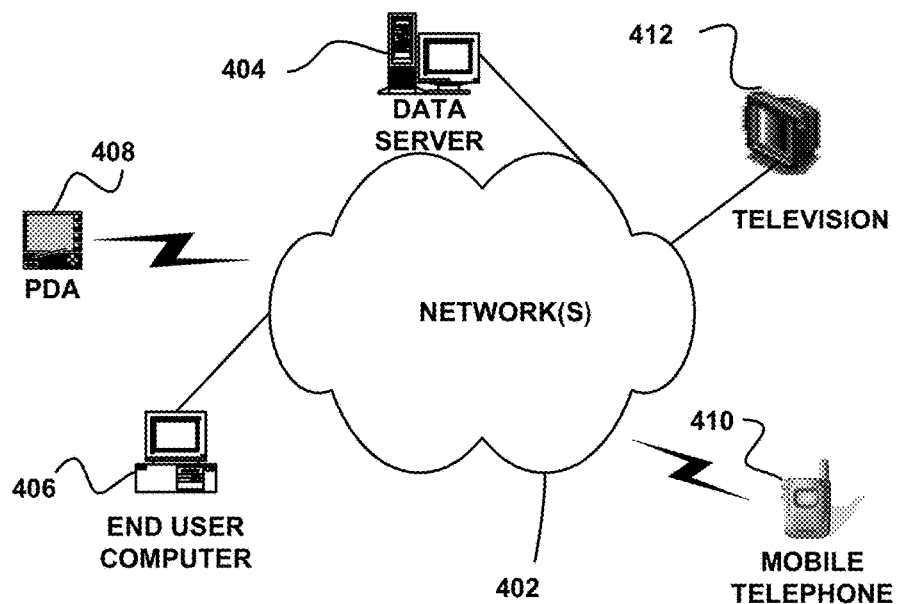
FIG. 4 illustrates a network architecture, in accordance with one possible embodiment.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
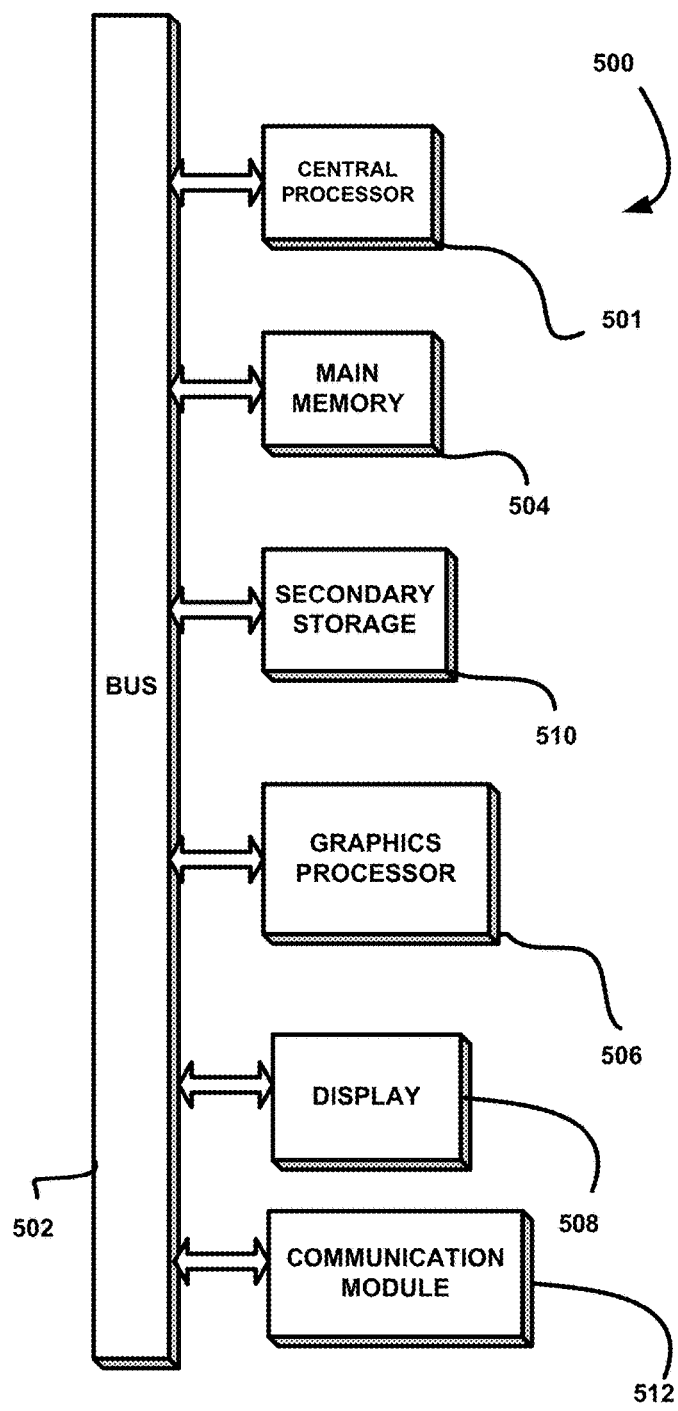
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
creating, by a computer hardware system, a Nexus repository staging;
identifying, by the computer hardware system, a first version of a RPM data package to compare with a second version of a RPM data package;
deploying, by the computer hardware system, build artifacts for the second version of the RPM data package to the Nexus repository staging;
deploying, by the computer hardware system, assembly artifacts for the second version of the RPM data package to the Nexus repository staging;
deploying, by the computer hardware system, RPM artifacts for the second version of the RPM data package to the Nexus repository staging;
comparing, by the computer hardware system, the first version of the RPM data package with the second version of the RPM data package including:
  requesting, from the Nexus repository staging, RPM artifacts for the second version of the RPM data package,
  receiving, responsive to the requesting, a list of the RPM artifacts for the second version of the RPM data package,
  identifying the first version of the RPM data package from the Nexus repository staging, and
  after receiving the list of the RPM artifacts for the second version of the RPM data package and after identifying the first version of the RPM data package from the Nexus repository staging, comparing the first version of the RPM data package with the second version of the RPM data package including comparing:
    generated files,
    file owner and permissions, and
    dry mode execution;
promoting, by the computer hardware system, the Nexus repository staging for release; and
generating, by the computer hardware system, a version file including difference information based on comparing the first version of the RPM data package with the second version of the RPM data package.

2. The method of claim 1, wherein the first version of the RPM data package includes a newer release than the second version of the RPM data package.

3. The method of claim 1, wherein the difference information includes specification information.

4. The method of claim 1, wherein the difference information includes attribute information.

5. The method of claim 1, wherein the difference information is delivered as a code change between the first version of the RPM data package and the second version of the RPM data package.

6. The method of claim 1, wherein the computer hardware system generates a report showing the difference information.

7. The method of claim 6, wherein the computer hardware system displays the report showing the difference information utilizing a user interface.

8. A computer program product embodied on a non-transitory computer readable medium, comprising computer code for:
creating, by a computer hardware system, a Nexus repository staging;
identifying, by the computer hardware system, a first version of a RPM data package to compare with a second version of a RPM data package;
deploying, by the computer hardware system, build artifacts for the second version of the RPM data package to the Nexus repository staging;
deploying, by the computer hardware system, assembly artifacts for the second version of the RPM data package to the Nexus repository staging;

deploying, by the computer hardware system, RPM artifacts for the second version of the RPM data package to the Nexus repository staging;

comparing, by the computer hardware system, the first version of the RPM data package with the second version of the RPM data package including:

requesting, from the Nexus repository staging, RPM artifacts for the second version of the RPM data package, receiving, responsive to the requesting, a list of the RPM artifacts for the second version of the RPM data package, identifying the first version of the RPM data package from the Nexus repository staging, and after receiving the list of the RPM artifacts for the second version of the RPM data package and after identifying the first version of the RPM data package from the Nexus repository staging, comparing the first version of the RPM data package with the second version of the RPM data package including comparing:

generated files, file owner and permissions, and dry mode execution;

promoting, by the computer hardware system, the Nexus repository staging for release; and generating, by the computer hardware system, a version file including difference information based on comparing the first version of the RPM data package with the second version of the RPM data package.

9. The computer program product of claim 8, wherein the first version of the RPM data package includes a newer release than the second version of the RPM data package.

10. The computer program product of claim 8, wherein the difference information includes specification information.

11. The computer program product of claim 8, wherein the difference information includes attribute information.

12. The computer program product of claim 8, wherein the difference information is delivered as a code change between the first version of the RPM data package and the second version of the RPM data package.

13. The computer program product of claim 8, wherein the computer hardware system generates a report showing the difference information.

14. The computer program product of claim 13, wherein the computer hardware system displays the report showing the difference information utilizing a user interface.

15. A computer hardware system, comprising one or more processors, operable for:

creating, by the computer hardware system, a Nexus repository staging;

identifying, by the computer hardware system, a first version of a RPM data package to compare with a second version of a RPM data package;

deploying, by the computer hardware system, build artifacts for the second version of the RPM data package to the Nexus repository staging;

deploying, by the computer hardware system, assembly artifacts for the second version of the RPM data package to the Nexus repository staging;

deploying, by the computer hardware system, RPM artifacts for the second version of the RPM data package to the Nexus repository staging;

comparing, by the computer hardware system, the first version of the RPM data package with the second version of the RPM data package including:

requesting, from the Nexus repository staging, RPM artifacts for the second version of the RPM data package, receiving, responsive to the requesting, a list of the RPM artifacts for the second version of the RPM data package, identifying the first version of the RPM data package from the Nexus repository staging, and after receiving the list of the RPM artifacts for the second version of the RPM data package and after identifying the first version of the RPM data package from the Nexus repository staging, comparing the first version of the RPM data package with the second version of the RPM data package including comparing:

generated files, file owner and permissions, and dry mode execution;

promoting, by the computer hardware system, the Nexus repository staging for release; and generating, by the computer hardware system, a version file including difference information based on comparing the first version of the RPM data package with the second version of the RPM data package.

16. The system of claim 15, wherein the first version of the RPM data package includes a newer release than the second version of the RPM data package.

17. The system of claim 15, wherein the difference information includes specification information.

18. The system of claim 15, wherein the difference information includes attribute information.

19. The system of claim 15, wherein the difference information is delivered as a code change between the first version of the RPM data package and the second version of the RPM data package.

20. The system of claim 15, wherein the computer hardware system generates a report showing the difference information.

* * * * *